(12) United States Patent
Rodrigues et al.

(10) Patent No.: US 8,711,549 B2
(45) Date of Patent: Apr. 29, 2014

(54) THERMALLY EFFICIENT BUSWAY

(75) Inventors: Carlton R. Rodrigues, Mount Juliet, TN (US); Edgar Avalos Ortiz, Murfreeboro, TN (US); Timothy P. O'Leary, Antioch, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 476 days.

(21) Appl. No.: 13/172,482

(22) Filed: Jun. 29, 2011

(65) Prior Publication Data

US 2013/0003265 A1    Jan. 3, 2013

(51) Int. Cl.
*H02B 1/20* (2006.01)
*H02G 3/06* (2006.01)
*H01R 4/60* (2006.01)

(52) U.S. Cl.
USPC .......... 361/675; 174/68.2; 174/88 B; 439/213

(58) Field of Classification Search
USPC ......................................................... 361/675
See application file for complete search history.

(56) References Cited

U.S. PATENT DOCUMENTS

| | | | | |
|---|---|---|---|---|
| 2,376,307 | A | * | 5/1945 | Bosch ...................... 174/117 FF |
| 2,733,289 | A | | 1/1956 | Warren et al. |
| 4,174,143 | A | * | 11/1979 | Hicks et al. .................... 439/213 |
| 4,213,003 | A | * | 7/1980 | Carlson ....................... 174/88 B |
| 5,679,457 | A | | 10/1997 | Bergerson |
| 5,760,339 | A | * | 6/1998 | Faulkner et al. ............ 174/88 B |
| 6,146,169 | A | * | 11/2000 | Calder et al. ................... 439/213 |
| 7,819,681 | B1 | * | 10/2010 | Rodrigues et al. ............ 439/213 |
| 8,177,569 | B1 | * | 5/2012 | Dozier et al. ................. 439/213 |
| 8,258,404 | B2 | * | 9/2012 | Latimer .................... 174/149 B |

FOREIGN PATENT DOCUMENTS

JP      2009038949      2/2009
WO      00/62389 A1     10/2000

OTHER PUBLICATIONS

Gap Pad® 2000SF, Thermally Conductive, Silicone-Free Gap Filling Material; The Bergquist Company; dated Jun. 15, 2005; (5 pages).
International Search Report corresponding to co-pending International Patent Application Serial No. PCT/US2012/042234, European Patent Office, dated Oct. 2, 2012 (5 pages).
International Written Opinion corresponding to co-pending International Patent Application Serial No. PCT/US2012/042234, European Patent Office, dated Oct. 2, 2012; (7 pages).

* cited by examiner

*Primary Examiner* — Gregory Thompson
(74) *Attorney, Agent, or Firm* — Locke Lord LLP

(57) ABSTRACT

A busway having multiple busbar conductors and pads composed of a thermally conductive, insulating material (TCIM) sandwiched in between each of the conductors and between the outermost conductors and the inside of the busway housing. The busway preferably includes three sets of TCIM pads, one set in the center of the busway, and a set at either end of the busway where a joint pack is installed to join multiple sections of busway sections together. The insulating material on the conductors has a cutout to expose the bare metal of the conductors, and a TCIM pad is placed directly on the exposed metal through the cutout, to form a thermal conduit between the busbar conductors to the metal housing of the busway, thereby reducing the temperatures of the busbar conductors and the joint pack during normal operation in which hundreds or thousands of amps of current are carried through the busway sections.

19 Claims, 9 Drawing Sheets

THERMALLY EFFICIENT BUSWAY

FIELD OF THE INVENTION

The present disclosure relates to busway sections used in electrical distribution systems.

BACKGROUND

A busway as used in an electrical distribution system, which can include a switchboard, switchgear, or motor-control center, includes a housing enclosing a stack of insulated electrical phase conductors called busbars, in prefabricated sections. The sections are joined together to carry the different phases of electrical current from a source of energy to one or more loads. The conductors are typically made of copper and can carry hundreds or even thousands of amps of current. As a result, these conductors get very hot and efforts are made to cool them so that they meet thermal requirements set by a certification organization such as Underwriters Laboratory (UL). One way to cool conductors is to add more copper by making them thicker or wider, but copper is expensive and more of it adds bulkiness and heft to the busway overall.

There are two types of busways, feeder busways and plug-in busways. Feeder busways feed long (e.g., up to ten feet) straight sections of current, while plug-in busways allow for connections, typically in a perpendicular manner, to the long sections of the busways, to route the current to other areas of an electrical distribution system. To allow for connections to the plug-in busways, some busbar conductors in plug-in busways have flared-out sections to accommodate the busbar conductors from the connections. These flared-out sections create relatively larger air gaps between the busbar conductors so that the connections can fit snugly in between the air gaps to create electrical connections to each phase. The busbar conductors become particularly hot in the areas near points of contact. This is generally because of additional contact resistance at the points of contact which generate increased power losses at the points of contact. The increased power loss coupled with the thermal resistances for the busway system usually cause an increase in temperature at the points of contact.

Multiple busway sections can be connected together using joint packs, which are metal housings with insulated conductive fingers that receive the ends of busbar conductors from different busway sections. As above, the end of each busway section is flared to allow joining. These joint packs can also become very hot as they transfer electrical current from one busway to the next. To meet UL or other certification requirements, a certain amount of copper or conductive material needs to be used to ensure that during normal operating conditions the temperatures of the busbar conductors and joint packs do not exceed rated requirements. If the temperature of the busbar conductors and/or the joint packs can be reduced, less copper can be used in both the busbar conductors and the joint packs, which reduces weight and bulk as well as cost, as long as the cost of a thermal mitigation solution does not exceed the cost of the copper reduction.

Thus, a need exists for an improved thermal management system for a busway to lower temperatures along the busway under normal operating conditions.

BRIEF SUMMARY

The present disclosure describes a solution for lowering the temperature of a busway and a joint pack used to connect multiple busway sections together. To do so, pads composed of a thermally conductive but electrically insulating material are placed at efficacious locations along the length of the busbars to provide a conduit for thermal heat generated by the busbar conductors and joint packs to pass through the housing of the busway or joint pack into the ambient environment. As a result, the temperature of the busbar conductors as well as the joint packs is reduced, such as by four degrees Celsius or more, allowing less copper to be used in the busbar conductors or joint packs, saving weight and bulk as well as cost in both. Importantly, not only do the pads reduce the temperature of the busbar conductors but also the joint packs that connect multiple busway sections together.

Each pad is made of a compressible material so that it can conform to the slightly imperfect geometry of the busbar conductor and to the uneven surfaces presented by a cutout in the insulating sleeve that wraps around the busbar conductor to insulate it from adjacent busbar conductors carrying a different phase of current. The insulating sleeve has a cutout that is smaller than the size of the pad, and the pad has an adhesive backing that is removed to expose an adhesive layer to temporarily affix the pad to the exposed metal of the busbar conductor through the cutout. The pad is sized to be at least slightly larger than the cutout so that no exposed metal from the busbar conductors can cause an electrical short or arcing between adjacent conductors.

In busway sections that come in configurations of four busbar conductors, the fourth busbar conductor is used for connection to neutral or ground. Pads are placed near the ends of the conductors where joint packs can be attached to connect multiple sections of busway sections together. Depending on the length of the busbar conductors, pads are also placed in the approximate center of the busway to cool the middle portion of the busway. The pads are placed between each opposing pair of conductors as well as between the outermost conductors and an inner surface of the housing that houses the conductors. The pads are in direct contact with a metal portion of the busbar conductor so that thermal energy generated by the current flowing through the conductor is transferred directly to the pads, which in turn transfer the thermal energy toward the housing and out into the ambient environment.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
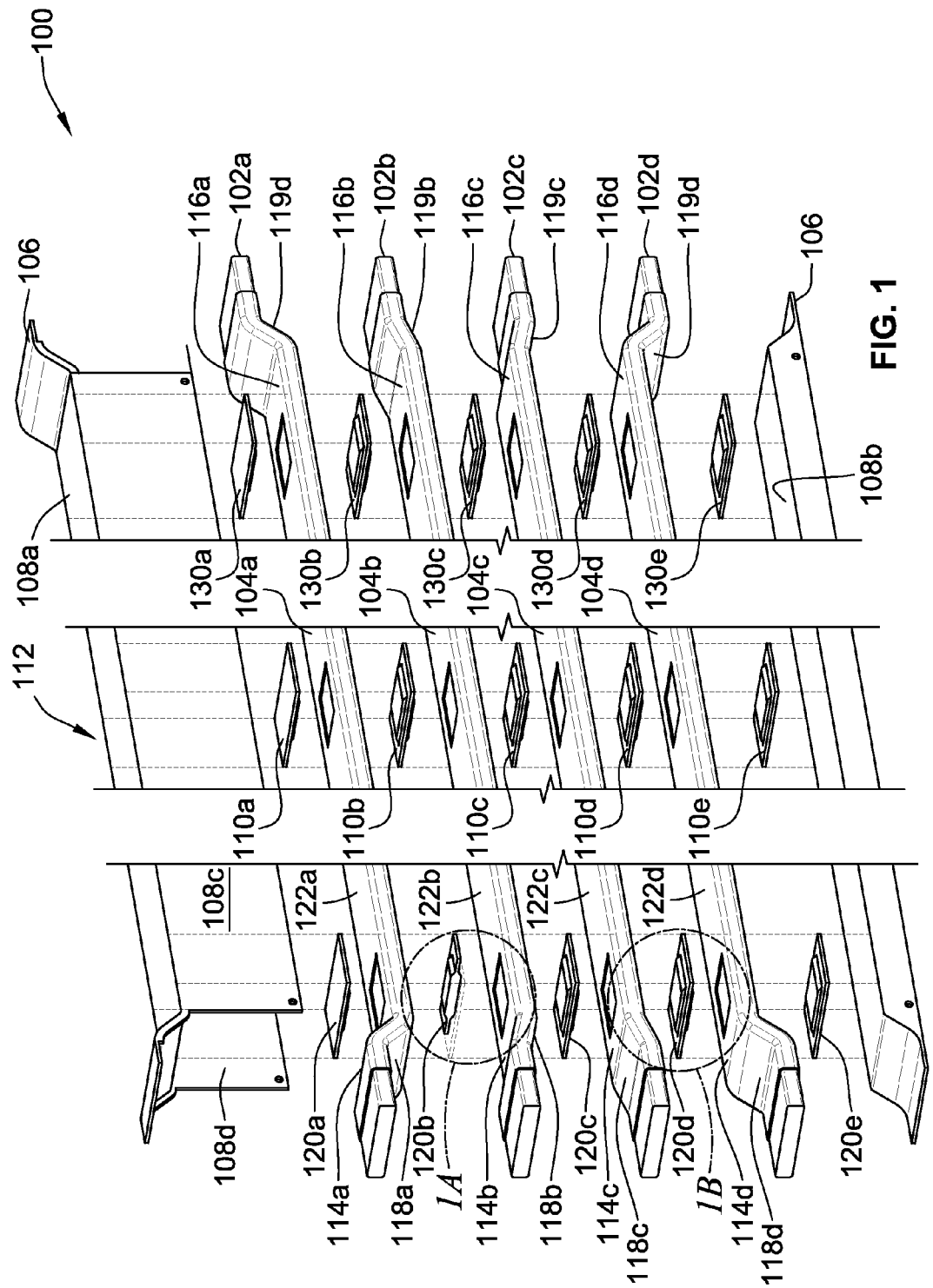
FIG. 1 is a perspective illustration of a busway section shown in exploded form and three sets of pads composed of a thermally conductive, insulating material.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a perspective illustration of a busway section 100 shown in exploded form for ease of illustration. The busway section 100 includes four electrically conductive busbar conductors 102a,b,c,d stacked on top of one another to form a stack 101 (see FIG. 2). Each of the busbar conductors 102a-d has an elongated straight section 104a-d, respectively, and are composed of an electrically conductive material, such as a material that includes copper. Each busbar conductor 102a-d includes an electrically insulating sheet or sleeve 122a-d that surrounds or wraps around the busbar conductors 102a-d and is present in all areas where any busbar conductors 102 is in physical contact with an adjacent busbar conductor 102.

In this illustrated example, four busbar conductors 102 are shown, with three of the conductors 102 conventionally carrying a different phase of electricity (typically labeled A, B, and C to designate that each phase of current lags the other by 120 degrees), and the fourth conductor 102 being conventionally connected to neutral or ground. The insulating sheets or sleeves 122 can include one or more layers of insulating material and can be made of any suitable dielectric material such as a polyester film, such as MYLAR® Biaxially-oriented polyethylene terephthalate (boPET), or an epoxy coating or layer, for example. The elongated straight section 104 can be, for example, up to ten feet in length and rated to carry on the order of hundreds of amps, such as 225 amps, up to thousands of amps of electrical current.

The busway section 100 includes a housing 106 having a top section 108a over the topmost busbar conductor 102a and a bottom section 108b under the bottommost busbar conductor 102d. As used in this disclosure, the terms "topmost," "top," "bottommost," and "bottom" are not intended to suggest a particular orientation of the busway. For example, when the busway is mounted vertically relative to earth, the topmost conductor 102a can be the leftmost conductor while the bottommost conductor 102d can be the rightmost conductor when viewed from a standing position on earth. The busway section 100 can be put into any orientation, including vertical, horizontal, or slanted.

The housing 106 also includes two opposing side sections 108c,d. Together, the top, bottom, and side sections 108a-d substantially enclose the busbar conductors 102 to form the busway section 100. The busway section 100 includes a first set of thermally conductive, insulating material (TCIM) pads 110a,b,c,d,e positioned in a middle portion 112 of the stack 101 of conductors 102. In this illustrated example, the middle portion 112 corresponds to the center of the stack 101 of conductors 102.

By referring to the pads 110, 120, 130 as thermally conductive, insulating material, it is meant that these pads have and are designed and specifically configured to have the dual characteristics or properties of being thermally conductive as well as electrically insulating. Electrical insulation between each pair of busbar conductors 102 is crucial to avoid electrical shorting or arcing between phases or to neutral/ground. Thermal conductivity is important for ensuring that heat energy in the busbar conductors 102 is transferred away through the thermally conductive material of the pad 110, 120, 130. A thermal conductivity of at least 2.0 Watts per meter-Kelvin (W/m-K) is suitable, but other thermal conductivities can be used depending upon the current rating of the busway section 100. For higher current ratings, for example on the order of thousands of amps, a higher thermal conductivity is desirable relative to lower current ratings, for example on the order of hundreds of amps.

Although not essential, the TCIM pads 110, 120, 130 should be made of a compressible material to allow them to conform to the geometry of the busbar conductor 102 (which typically have imperfections) as described in more detail below. For example, an implementation of the present disclosure uses cutouts 124 (shown in FIG. 1B) in the electrical insulation material to expose a window of conductive metal on the busbar conductor 102, and the compressible material of the TCIM pad 110, 120, 130 can fill in the window, thereby making direct contact with the exposed metal while still maintaining a constant separation distance between adjacent busbar conductors 120. The cutouts are used to eliminate the insulating sheet in the area over which the TCIM pad is installed. Further, although not essential, each of the TCIM pads 110, 120, 130 can have an adhesive backing, which can be peeled off to expose an adhesive (shown in FIG. 3), to secure each pad to a corresponding section of the busbar conductor. Finally, preferably though not essentially the TCIM pads 110, 120, 130 can be silicone-free to avoid any adverse interactions caused by gasses emitted by materials containing silicone. An example of a suitable pad is the GAP PAD® 2000SF thermally conductive, silicone-free gap filling material available from Bergquist Company.

A first TCIM pad 110a is sandwiched between the topmost busbar conductor 102a and the top section 108a of the housing 106. By sandwiched, it is meant that the both sides of the TCIM pad are in direct physical contact with a conductive metal, be it a busbar conductor 102a,b,c,d or part of the housing 106. It is important for the TCIM pad 110a,b,c,d,e to be directly contacting a busbar conductor 102a,b,c,d or a section 108a,b of the housing 106, or both, so that heat energy generated by the busbar conductor 102a,b,c,d can be transferred directly to the TCIM pad 110a,b,c,d,e, which in turn transfers the heat energy to the conductive metal on the other side of the pad. The second TCIM pad 110b is sandwiched between the topmost busbar conductor 102a and a second busbar conductor 102b, the third TCIM pad 110c is sandwiched between the second busbar conductor 102b and a third busbar conductor 102c, and the fourth TCIM pad 110d is sandwiched between the third busbar conductor 102c and the bottommost busbar conductor 102d. Finally, the fifth TCIM pad 110e is sandwiched between the bottommost busbar conductor 102d and the bottom section 108b of the housing 106.

The first set of pads 110 form a heat sink or thermal bridge from the stack 101 of conductors 102 to the housing 106. Thermal energy generated by electrical current passing through the conductors 102 is transferred away toward the housing 106 by corresponding TCIM pads 110 that act as a thermal conduit in the middle portion 112 of the busbar for the heat energy to be transferred away from the conductors 102 and to the housing 106, which itself radiates away the thermal energy into the ambient environment, which is the environment external to the housing 106.

The busway section 100 can include only one set of TCIM pads 110 or two more sets of TCIM pads. As shown in FIG. 1, there are three sets of TCIM pads. The next two sets of TCIM pads are described below. Like the first set of TCIM pads 110, the second set of TCIM pads 120 and the third set of TCIM pads 130 are sandwiched between each directly opposing pair of busbar conductors 102 and between the topmost busbar conductor 102 and the top section of the housing 108a and between the bottommost busbar conductor 102 and the bottom section 108b of the housing 106 to form a heat sink from the stack 101 of the conductors 102 to the housing 106.

Each of the busbar conductors 102a,b,c,d has a corresponding first joint end portion 114a,b,c,d and a second joint end portion 116a,b,c,d at the other end of the conductor. In the illustrated example shown in FIG. 1, the conductors 102 have mirror-image flared-out sections 118a,b,c,d and 119a,b,c,d immediately following the joint end portions 114a,b,c,d, 116a,b,c,d for connection to a feeder-type busway or a plug-in type busway.

The second set of TCIM pads 120 is positioned at a first joint end portion 114a,b,c,d of the stack 101 of conductors 102 such that respective ones of the second set of pads 120 are sandwiched between each directly opposing pair of the busbar conductors 102, between the topmost busbar conductor 102a and the top section of the housing 108a, and between the bottommost busbar conductor 102d and the bottom section 108b of the housing 106. In other words, a first TCIM pad 120a is sandwiched between the topmost busbar conductor 102a and the top section 108a of the housing 106 at the first joint end portion 114a. A second TCIM pad 120b is sandwiched between the topmost busbar conductor 102a and the second busbar conductor 102b at the first joint end portion 114b. A third TCIM 120c pad is sandwiched between the second busbar conductor 102b and the third busbar conductor 102c at the first joint end portion 114c. A fourth TCIM pad 120d is sandwiched between the third busbar conductor 102c and the bottommost busbar conductor 102d at the first joint end portion 114d. A fifth TCIM pad 120e is sandwiched between the bottommost busbar conductor 102d and the bottom section 108b of the housing 106.

Again, like the first set of pads 110, the second set of pads 120 form a heat sink at the first joint end portion 114 from the stack 101 of conductors 102 to the housing 106. Thermal energy generated by electrical current passing through the conductors 102 is transferred away toward the housing 106 by corresponding TCIM pads 120 that act as a thermal conduit in the first joint end portion 114 of the busbar conductor 102 for the heat energy to be transferred away from the conductors 102 and to the housing 106, which itself radiates away the thermal energy into the ambient environment.

The third set of TCIM pads 130 is positioned at a second joint end portion 116a,b,c,d of the stack 101 of conductors 102 opposite the first end portion. A TCIM pad 130a,b,c,d,e is sandwiched between each directly opposing pair of the busbar conductors, between the topmost busbar conductor and the top section of the housing, and between the bottommost busbar conductor and the bottom section of the housing to form a heat sink from the stack 101 of conductors to the housing 106. In other words, a first TCIM pad 130a is sandwiched between the topmost busbar conductor 102a and the top section 108a of the housing 106 at the second joint end portion 116a. A second TCIM pad 130b is sandwiched between the topmost busbar conductor 102a and the second busbar conductor 102b at the second joint end portion 116b. A third TCIM 130c pad is sandwiched between the second busbar conductor 102b and the third busbar conductor 102c at the second joint end portion 116c. A fourth TCIM pad 130d is sandwiched between the third busbar conductor 102c and the bottommost busbar conductor 102d at the second joint end portion 116d. A fifth TCIM pad 130e is sandwiched between the bottommost busbar conductor 102d and the bottom section 108b of the housing 106.

Again, like the first and second sets of pads 110, 120, the third set of pads 130 form a heat sink at the second joint end portion 116 from the stack 101 of conductors 102 to the housing 106. Thermal energy generated by electrical current passing through the conductors 102 is transferred away toward the housing 106 by corresponding TCIM pads 130 that act as a thermal conduit in the second joint end portion 116 of the busbar conductor 102 for the heat energy to be transferred away from the conductors 102 and to the housing 106, which itself radiates away the thermal energy into the ambient environment.

Figure 1A:
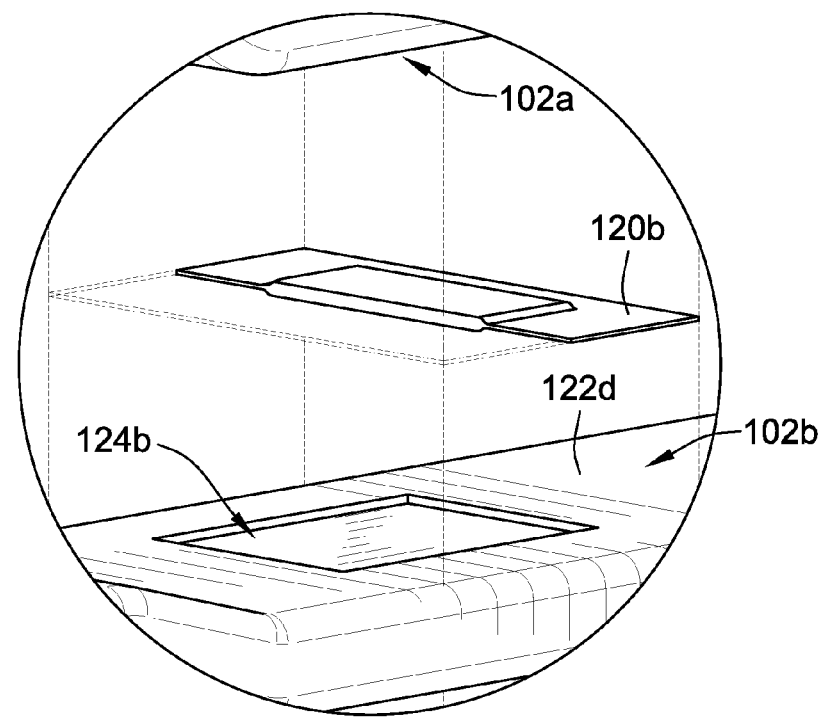
FIG. 1A is an enlarged view of a cutaway of a TCIM pad shown in FIG. 1 positioned over a cutout in an insulating sheet or sleeve of a busbar conductor.
Figure 1B:
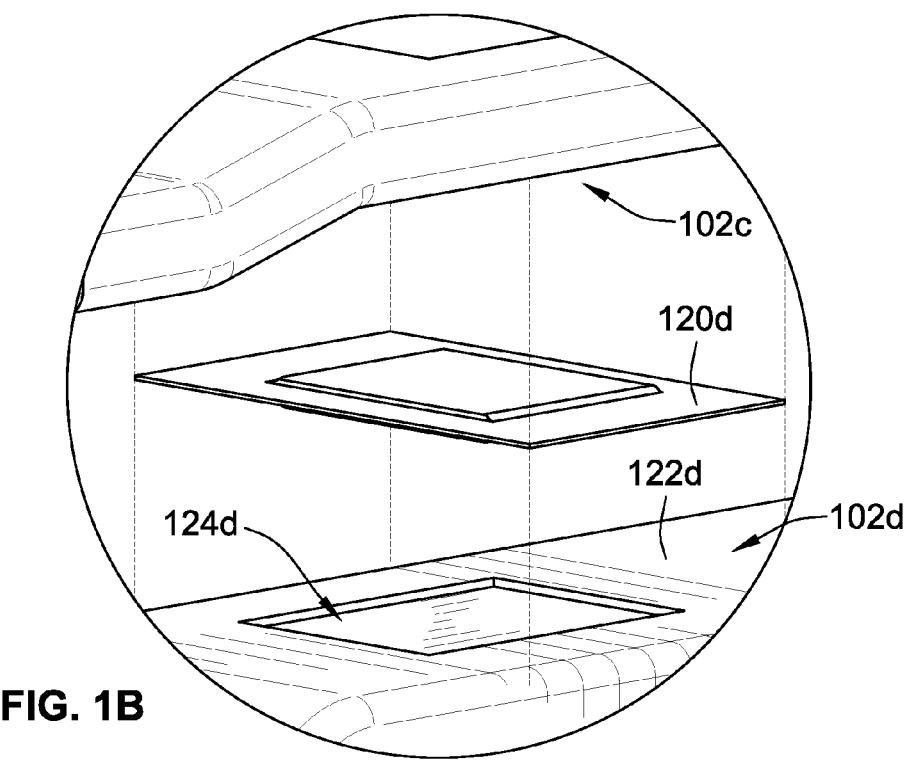
FIG. 1B is an enlarged view of another TCIM pad shown in FIG. 1 positioned over another cutout in another insulating sheet or sleeve of another busbar conductor.

Having described the general busway section 100, attention will be drawn to FIGS. 1A and 1B, which show enlarged illustrations of two example TCIM pads 120b, 120d in an exploded view. For convenience, when referring to a pad or a conductor by a reference number 120 or 102 without a reference letter, it is meant that the accompanying description applies to any pad or conductor described herein. And although three sets of TCIM pads are given separate reference numbers 110, 120, 130 in this illustrated example, when describing any TCIM pad, the same description applies to all other TCIM pads in the example being described.

In the illustrated example shown in FIGS. 1A and 1B, each of the busbar conductors 102 includes the electrically insulating sheet 122 that covers all surfaces, i.e., top surface, bottom surface, and side edges of the corresponding elongated straight sections 104 of the busbar conductors 102, except in an area shown as a cutout 124 where a portion or all of the TCIM pad 120 directly contacts the busbar conductor 102. FIGS. 1A and 1B show the TCIM pads 120 as being compressed at their edges due to the compressible material of the TCIM pad as the weight of the adjacent busbar conductors 102 compress the material over the insulating sheet 122 in the areas around the cutout 124. This compression can be seen in more detail in FIG. 3, described below. As emphasized herein, the insulating sheet can take the form of an epoxy coating or layer. The term "sheet" or "sleeve" as used herein means that wherever the insulating material is present over a busbar conductor, it is continuously present across the conductor surface(s) so that there are no openings in the dielectric for phase-to-phase or phase-to-neutral/ground electrical arcing or shorting to occur, except of course in the areas where the TCIM pads are installed and at the joint ends where the busbar conductors are connected to a joint pack.

It is important that the TCIM pad 120 completely cover the cutout 124 so that there is no chance for electrical shorting or arcing between adjacent busbar conductors 102. In this respect, the cutout 124 has width and length dimensions smaller than corresponding width and length dimensions of the pad 120. For ease of manufacture, in the illustrated example, the TCIM pad 110, 120, 130 has a generally square shape, although those of ordinary skill in the art will readily appreciate that the pads 110, 120, 130 and the cutouts 124 can take any shape so long as there is no exposed metal from the busbar conductor between an adjacent busbar conductor 102 or section of the housing 106.

Figure 2:
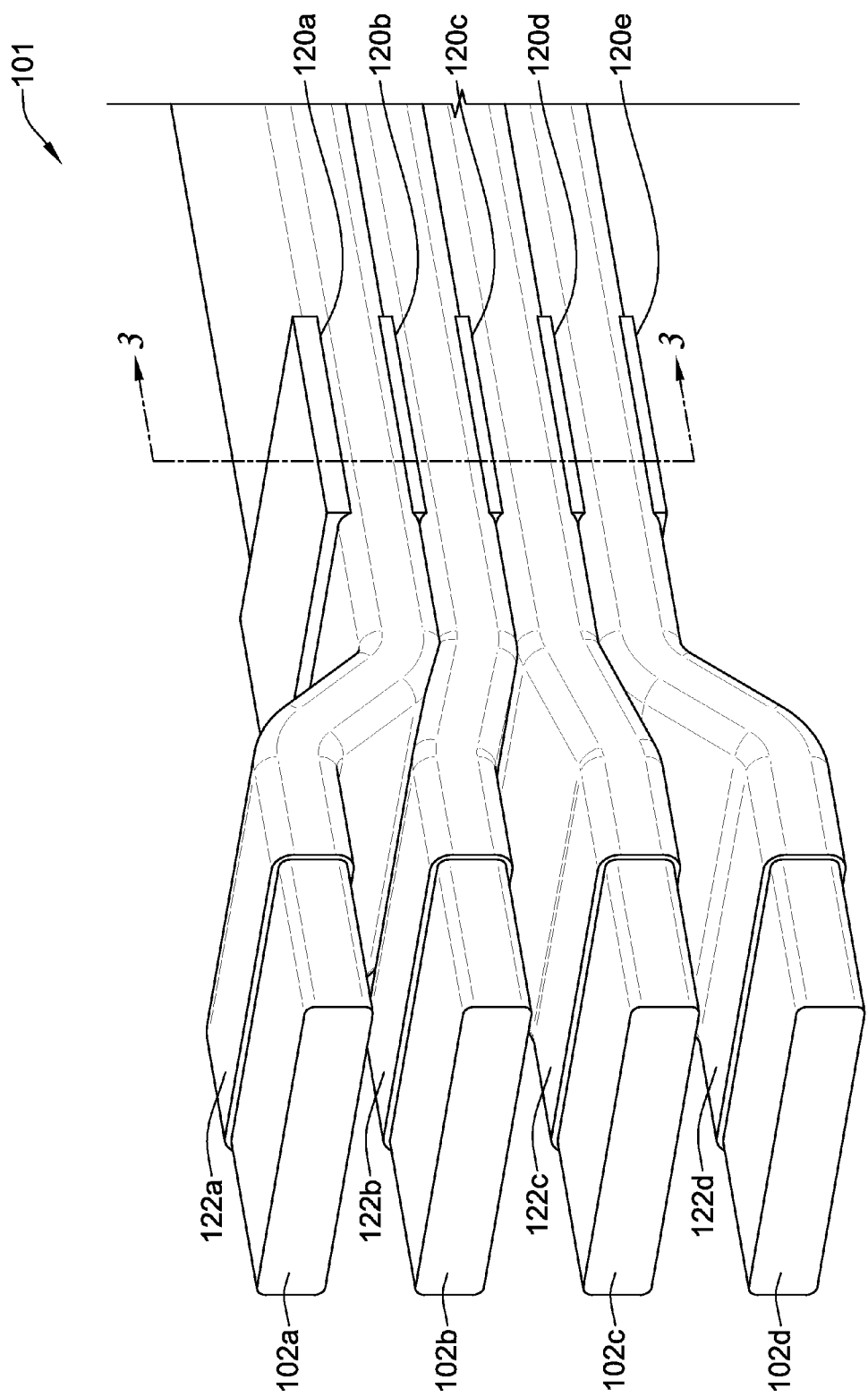
FIG. 2 illustrates one end of the stack 101 in an assembled configuration in which one set of the TCIM pads shown in FIG. 1 are compressed securely between each of the busbar conductors.

FIG. 2 shows just part of one end of the busway section 100 with all of the busbar conductors 102a,b,c,d joined together with the TCIM pads 120a,b,c,d,e sandwiched in between each busbar conductor 102 and positioned above the topmost busbar conductor 102a and below the bottommost busbar conductor 102d. Although in this illustration, each of the TCIM pads 120 is shown as having a width dimension identical to a width dimension of the busbars 102, in other implementations, the TCIM pad 110, 120, 130 can have a width less than the width of the busbars 102 so long as there is no exposed metal between adjacent conductors 102 in the areas where the TCIM pad 110, 120, 130 is placed. In FIG. 2, the TCIM pads 120 are also exposed at the narrow edges of the busbar conductors 102, allowing them to directly contact the side sections 108c,d of the housing 106 (FIG. 1). In this manner, thermal energy can also be conducted toward the side sections 108c,d of the housing 106 and out into the ambient environment through convection.

Figure 1C:
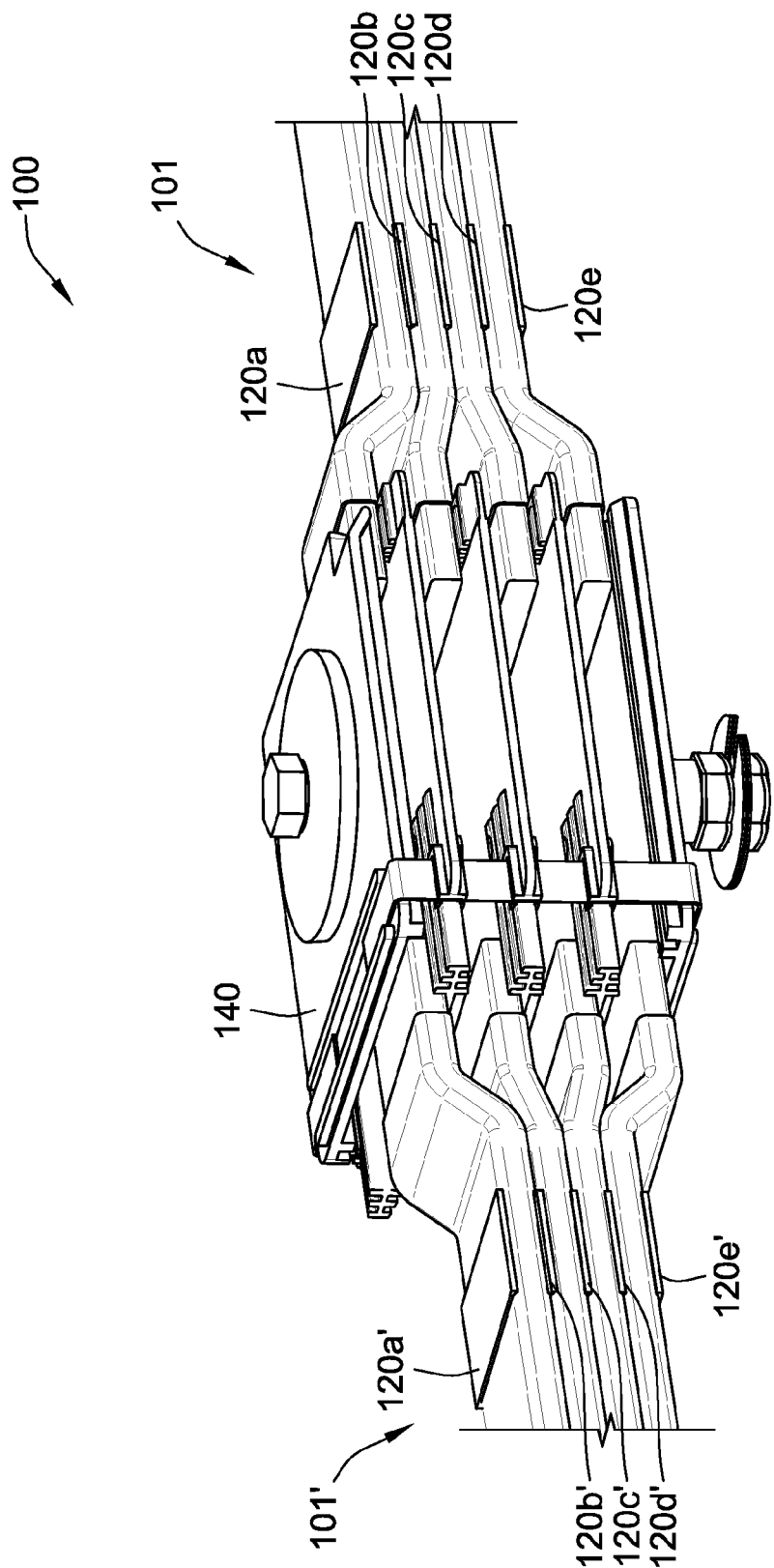
FIG. 1C is an perspective illustration of a joint pack with its housing removed for ease of illustration and two busway sections (also with their housings removed for ease of illustration) joined together by the joint pack.

The busway section 100 can further include a joint pack 140 (shown in FIG. 1C with its housing removed for ease of illustration) for joining multiple busway sections together. An example of a joint pack is shown and described in commonly assigned U.S. Pat. No. 7,819,681, entitled "Thermally Efficient Busway Joint Pack." The first or second joint end portions 114 or 116 can be connected to the joint pack 140. When TCIM pads 120, 130 are installed at the end portions 114, 116 near the flared out sections 118, 119 of the busbar conductors 102, the overall temperature of the joint pack 140 is reduced under normal operating conditions compared to a busway section that lacks the second set or the third set of pads 120, 130. These advantageous temperature reductions under normal operating conditions are described in more detail below in connection with FIG. 4A. The joint pack 140 connects two sections of busway sections together. In FIG. 1C, the housings of the busway sections or the joint pack 140 are not illustrated for ease of illustration, and one stack 101 of busbar conductors 102a,b,c,d is shown connected to one side of the joint pack 140 and another stack 101' of busbar conductors 102a', 102b', 102c', and 102d' are connected to the other side of the joint pack 140. The stack 101' is identical to the stack 101 described above in connection with FIGS. 1, 1A, and 1B.

Figure 3:
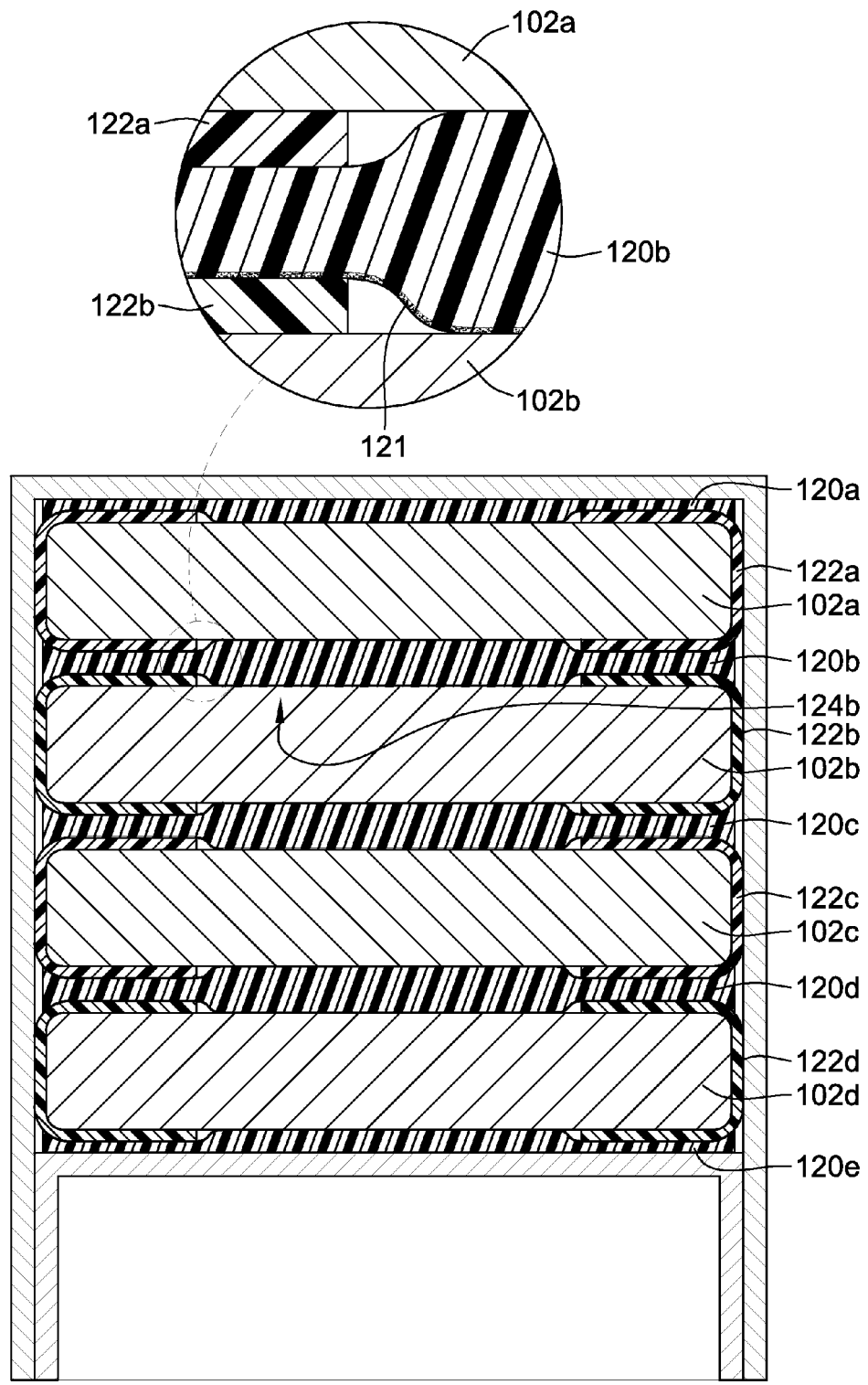
FIG. 3 is a cross-sectional view of the stack 101 taken along the lines 3-3 shown in FIG. 2.

FIG. 3 is a cross-sectional view of the busway section 100 along the lines 3-3 shown in FIG. 2. An enlarged view is shown to illustrate an optional adhesive 121 exposed on the back of the TCIM pad 120b. A backing material is removed prior to adhering the TCIM pad 120b over the cutout 124b, and the adhesive 121 at least temporarily holds the TCIM pad 120b to the insulating sheet 122b and/or the exposed metal of the busbar conductor 102b through the cutout 124b. The other TCIM pads 110, 120, 130 can likewise have an adhesive like the adhesive 121 shown in FIG. 3. As shown in FIG. 3, the compressible material of the TCIM pad 120b allows it to conform to the uneven geometries presented by the cutout 124 and the insulating sheet 122 to present a generally flat, planar surface for the busbar conductors 102 so that they remain level and consistently spaced relative to one another and within the housing 106.

Figure 4A:
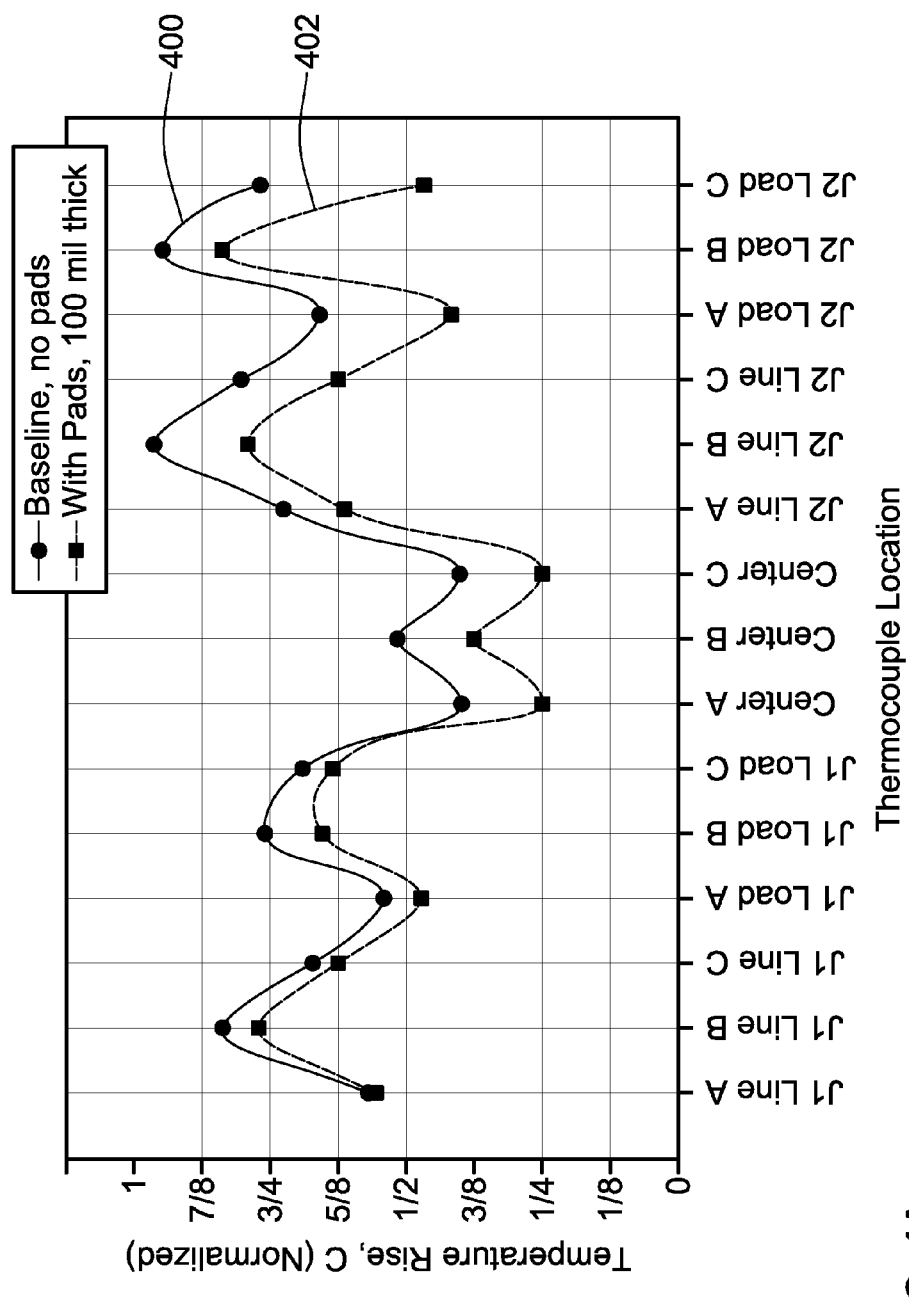
FIG. 4A illustrates two temperature plots of two different busway sections; one without the TCIM pads according to the present disclosure and one with TCIM pads according to the present disclosure.

FIG. 4A shows two plots 400, 402 of normalized temperature rises seen in two different busway sections under normal operating conditions. The first plot 400 shows the normalized temperature rises in degrees Celsius of a conventional feeder-type busway section without any TCIM pads 110, 120, 130. Three sets of five thermocouples were spaced along the length of each phase of three copper busbar conductors, which in this example, were ten feet long and rated to carry 2000 amps of electrical current. The second plot 402 shows the lower normalized temperature rises in degrees Celsius of a busway section similar to the busway section 100 shown in FIG. 1.

Figure 4B:
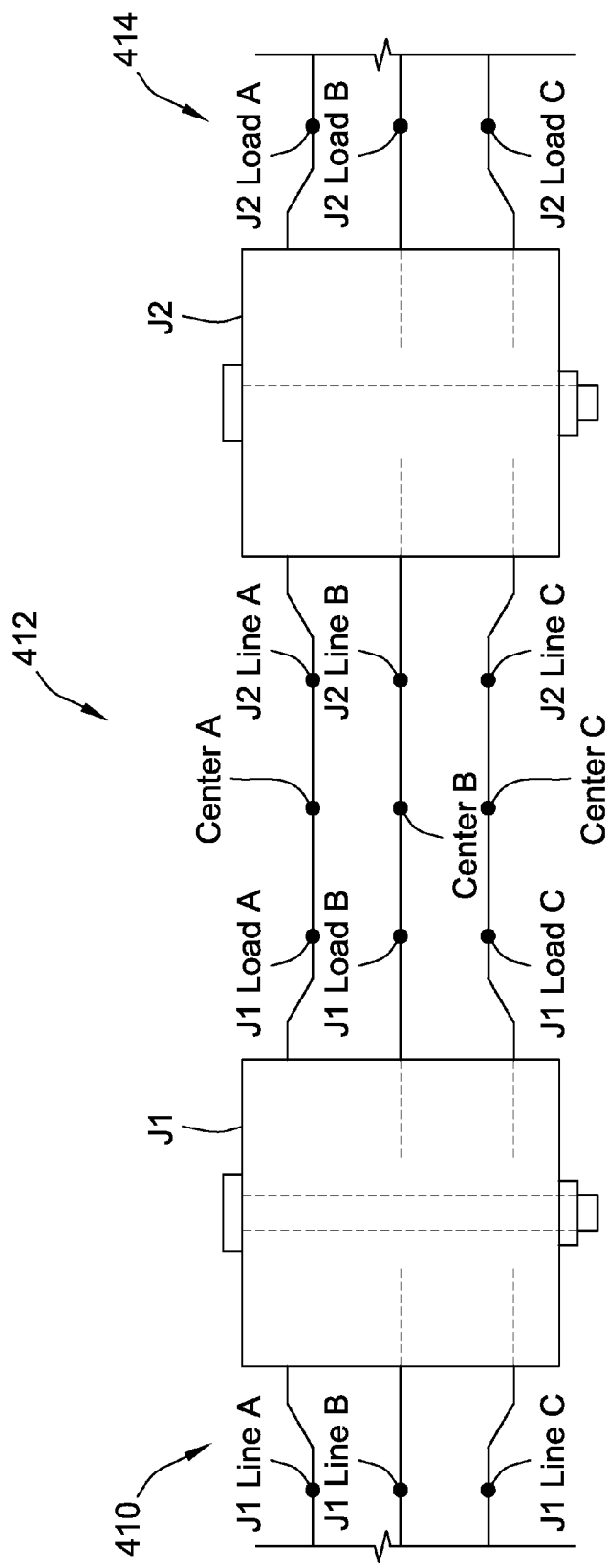
FIG. 4B is a functional block diagram showing the thermocouple locations for the busway systems used to generate the temperature plot 402 shown in FIG. 4A.

A total of three sets of five thermocouples were placed at locations along each phase of the ten-foot-long length of the busbar conductors 102, which were also rated to carry 2000 amps of current. FIG. 4B illustrates a functional block diagram of the thermocouple locations indicated in FIG. 4A. Three busways 410, 412, 414 (like the busway section 100) having three busbar conductors each carrying a separate phase (conventionally labeled A, B, C) of current were connected together by two joint packs (like the joint pack 140), labeled J1 and J2 in FIGS. 4A and 4B. Three thermocouples (one per phase) were attached to the side edges of the busbar conductors of the busway 410 on the line side of the joint pack J1, right before the flared-out sections, in the locations labeled J1 Line A, B, C, respectively. On the load side of the joint pack J1, three thermocouples (one per phase) were attached to the side edges of the busbar conductors of the busway 412, right before the flared-out sections, in the locations labeled J1 Load A, B, C, respectively. Three thermocouples (one per phase) were attached to the side edges of the busbar conductors at approximately the midpoint of the busway 412, or approximately five feet from the busbar conductor ends, in the locations labeled Center A, B, C, respectively. Three thermocouples (one per phase) were attached to the side edges of the busbar conductors of the busway 412 on the line side of the joint pack J2, right before the flared-out sections, in the locations labeled J2 Line A, B, C, respectively. Finally, three thermocouples (one per phase) were attached to the side edges of the busbar conductors of the busway 414 on the load side of the joint pack J2, right before the flared-out sections, in the locations labeled J2 Load A, B, C, respectively. Thus, a total of fifteen thermocouples were used to generate the plots 400, 402 shown in FIG. 4A. To generate plot 400, no TCIM pads were installed; and to generate plot 402, TCIM pads were installed as described below.

To generate the plot 402, four TCIM pads 110 were installed in the center of the busbar conductors 102 or five feet from the ends of the conductors 102. In addition, four TCIM pads 130 were also installed at one joint end 116 of the conductors 102. For this test, due to the long length of the busbar conductors, TCIM pads 110 were installed in the center of the busbar conductors as well as at each joint end 114, 116 of the conductors 102. As shown in FIG. 4A, an approximately 3% to 4% drop in temperature is observed relative to the busway section that lacks TCIM pads. This temperature reduction under normal operating conditions advantageously contributes towards the busway section 100 meeting thermal requirements set by Underwriter's Laboratories (UL) or other suitable certification organization or to reduce or optimize the amount of material in the conductors 102, thereby saving weight and cost, particularly when the material includes copper, while still satisfying thermal requirements set by a certification organization. Although the TCIM pads add cost and a relatively negligible amount of weight (offset by the removal of insulating sheet material), even a minor reduction in the amount of copper needed in the conductors significantly offsets any added cost and weight resulting from the addition of TCIM pads.

Figure 5:
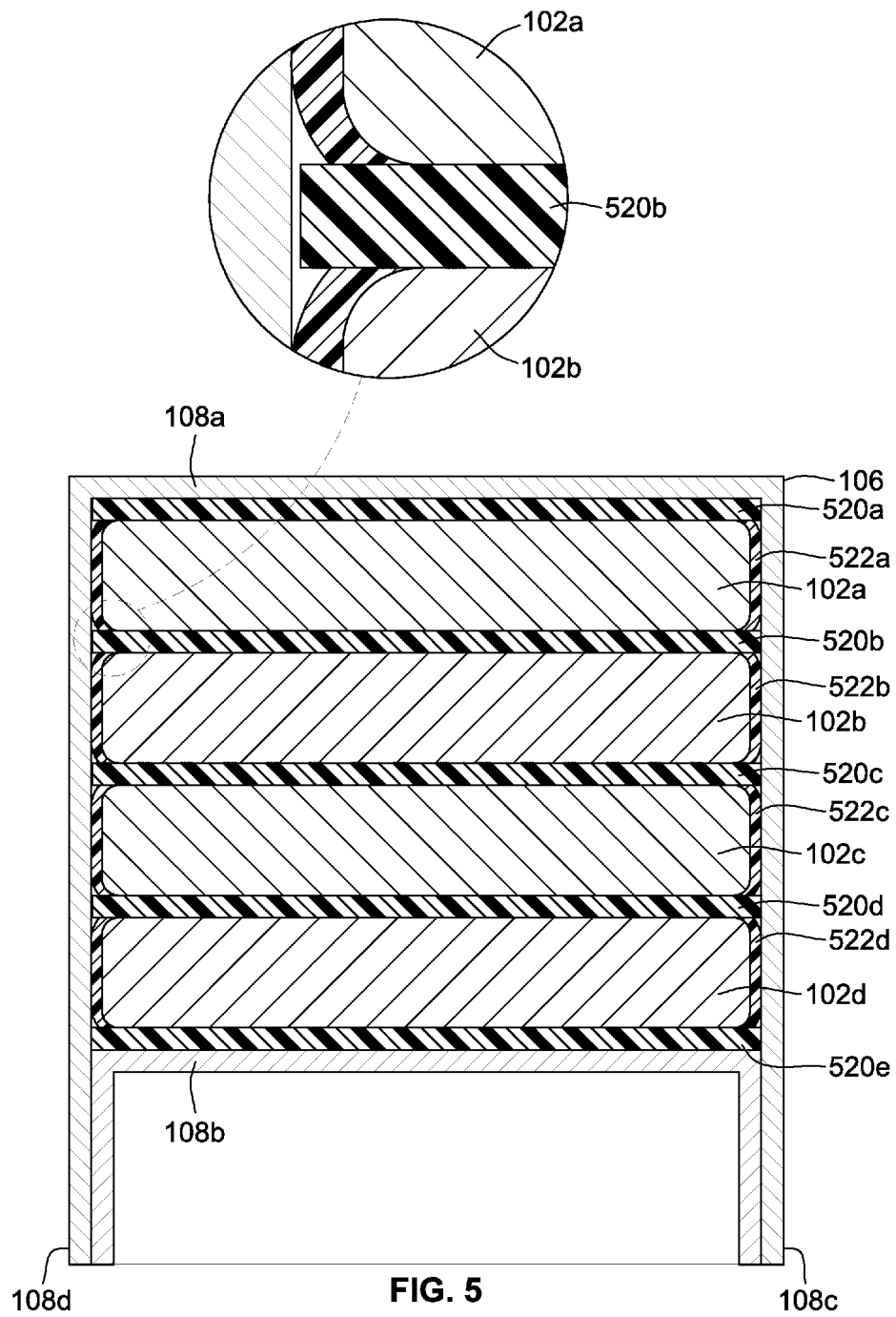
FIG. 5 is a cross-sectional view of another implementation of the TCIM pads in which the insulating sheet or sleeve of the busbar conductors has a different cutout than shown in FIGS. 1A and 1B.

FIG. 5 illustrates an alternate implementation of TCIM pads in which the insulating sheet 522 over the busbar conductors 102a,b,c,d lacks the cutout 124 shown in FIGS. 1A and 1B. Like reference numbers refer to like parts described above. Instead, the insulating sheet 522 is removed along the entire width of the busbar conductor 102 from the area where the TCIM pads 520a,b,c,d,e are placed directly onto the exposed metal sections of the busbar conductors 102a,b,c,d (see FIG. 6). Again, care is taken to ensure that there is no exposed metal from any busbar conductor 102 that can cause an electrical short or arc relative to an adjacent busbar conductor or section 108a,b,c,d of the housing 106. For example, to ensure dielectric clearances are achieved between the areas where the TCIM pads interface with the insulating sheets, a dielectric seal or putty can be introduced to ensure proper dielectric clearances. Alternately, the TCIM pads can be wrapped partially around the sides of the busbar conductors such that the pads overlap the insulating sheet, increasing dielectric clearances between conductors.

Figure 6:
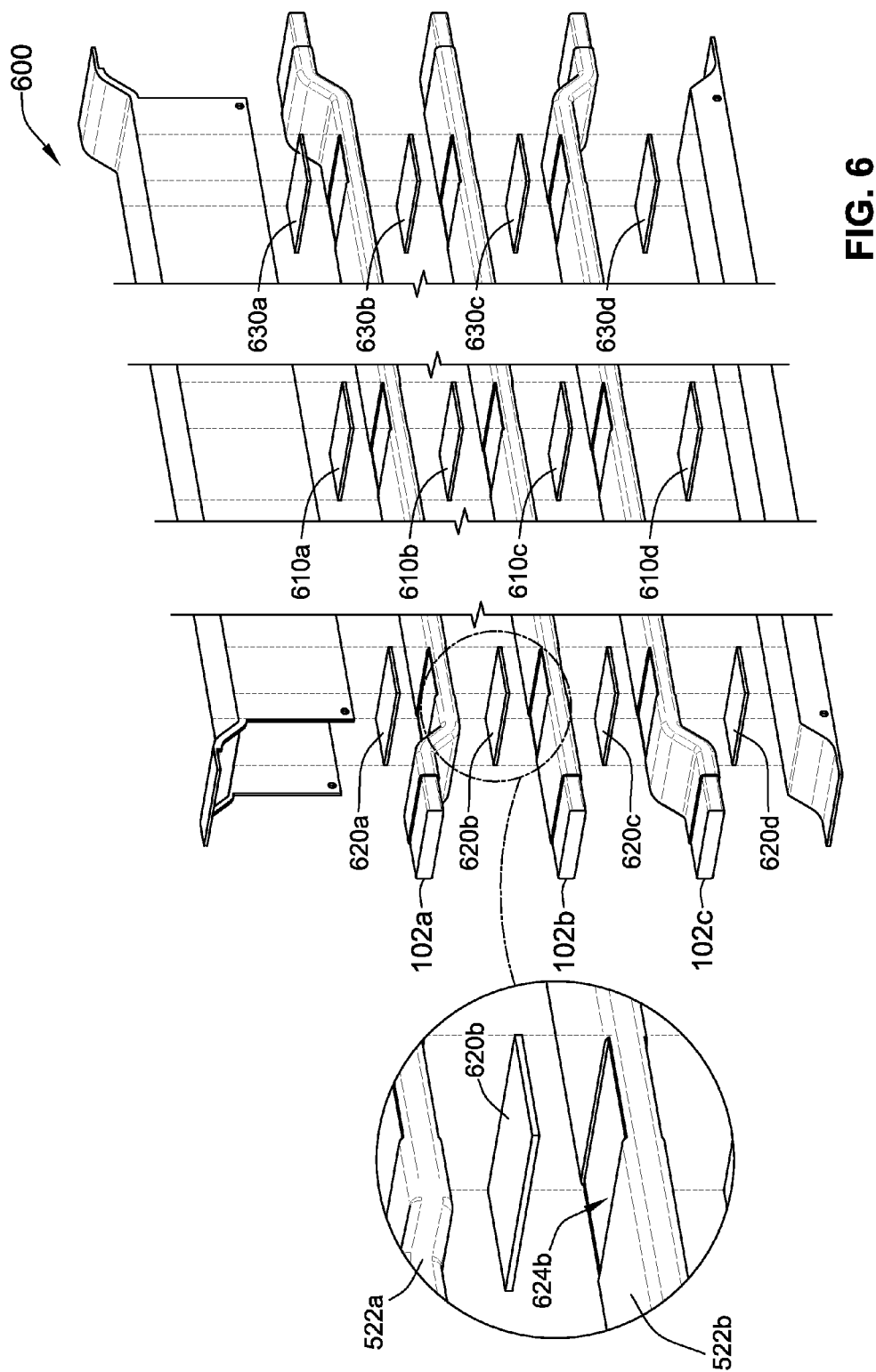
FIG. 6 is perspective illustration of a busway section shown in exploded form having three (as shown in FIG. 1) instead of four busbar conductors.

FIG. 6 is perspective illustration of another implementation of a busway section 600 shown in exploded form for ease of illustration with the TCIM pads configured as shown in FIG. 5 and having only three busbar conductors instead of four as shown in FIGS. 1 and 5. Like reference numbers refer to like parts described above. In this alternate configuration, only three busbar conductors 102a,b,c are shown, each carrying a different phase of electrical current. Instead of three sets of five TCIM pads, only three sets of four TCIM pads 610, 620, 630 are used due to the absence of the fourth busbar conductor 102d. The insulating sheet 522b includes a cutout 624b that extends along the width of the busbar conductor 102b, exposing the metal surface of the busbar conductor 102b. The TCIM pad 620b is sized to be at least identical or slightly larger than the cutout 624b so that no metal is exposed after the TCIM pad 620b is installed. The other TCIM pads 610, 620, 630 are similarly configured.

Instead of four or three busbar conductors, the present disclosure contemplates any number of busbar conductors, such as one, two, or more than four, and also multiple sets of busway stacks arranged side-by-side for higher current ratings, e.g., on the order of 4,000 amps and higher. The present disclosure is equally applicable to both feeder-type and plug-in-type busway sections. The busway sections described herein can be applied to any electrical distribution system that uses a busway architecture, including switchboards, switchgear, or motor-control centers, for example. The selective placement of the TCIM pads in the locations disclosed advantageously reduce the temperatures under normal operating conditions of not only the busbar conductors but also the joint packs that connect multiple busway sections together. At the joint ends of the busway sections, there is additional contact resistance at the points of contact which generate increased power losses at the points of contact. The increased power loss coupled with the thermal resistances for the busway usually cause an increase in temperature at the points of contact, which is where the TCIM pads are placed. In addition, the appropriate use of the TCIM can allow all dielectric and insulating requirements imposed by a certification organization such as UL to be met without sacrificing and even actually improving thermal performance of the busway sections and joint packs.

Instead of three sets of TCIM pads 110, 120, 130 (one set per phase), in other implementations, two, four, five, or more sets of TCIM pads (one set per phase) can be installed at efficacious locations along the busbar conductors to promote further cooling. For example, for longer lengths of busbar conductors, such as ten feet or longer, it can be desirable to place two sets of TCIM pads (one set per phase) at evenly spaced distances from the ends of the busbar conductors as well as a TCIM pad at each of the ends of the busbar conductors.

While at least two different cutouts 124, 624 have been shown in the drawings, it will be readily appreciated that the cutouts can take any regular or irregular geometric form, so long as they substantially directly expose the conductive metal of the busbar conductor over which the TCIM pad is installed. "Substantially" in this context means considerable in extent, or approximately, or largely but now wholly. For example, the busbar conductors can be coated with an epoxy, and the TCIM pad can be installed over the epoxy instead of being in direct physical contact with the metal surface of the busbar conductors. In this latter example, the TCIM pad is "substantially" exposed to the conductive metal through the epoxy even though the pad is not physically contacting the metal. For another example, multiple slits can be cut into the insulating sheet at various locations. Further, as noted above in connection with FIG. 2, the insulating sheet can also be removed from at least a portion of the narrow edges of the busbar conductors to expose the metal thereunder, and the TCIM pad placed over the busbar conductor such that part of the TCIM pad also covers the exposed narrow edges. When the side sections 108c,d of the housing 106 are installed around the busbar conductors, the TCIM pads directly contact the side sections 108c,d allowing thermal transfer of heat energy to be conducted away from the narrow sides of the busbar conductors to the side sections 108c,d of the housing 106 and ultimately out into the ambient environment external to the housing 106.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A busway section, comprising:
   a plurality of electrically conductive busbar conductors stacked on top of one another to form a stack, each of the busbar conductors having an elongated straight section;
   a housing having a top section over a topmost one of the busbar conductors and a bottom section under a bottommost one of the busbar conductors;
   a first set of thermally conductive, insulating material (TCIM) pads positioned at a first joint end portion of the stack of conductors such that respective ones of the first set of pads are sandwiched between each directly opposing pair of the busbar conductors, sandwiched between a topmost busbar conductor and the top section of the housing, and sandwiched between a bottommost busbar conductor and the bottom section of the housing to form a thermal bridge or heat sink from the stack of conductors to the housing.

2. The busway section of claim 1, further comprising:
   a second set of TCIM pads positioned in a middle portion of the stack of conductors such that respective ones of the second set of pads are sandwiched between each directly opposing pair of the busbar conductors, between the topmost busbar conductor and the top section of the housing, and between the bottommost busbar conductor and the bottom section of the housing to form a thermal bridge or heat sink from the stack of conductors to the housing; and a third set of TCIM pads positioned at a second joint end portion of the stack of conductors opposite the first end portion such that respective ones of the third set of pads are sandwiched between each directly opposing pair of the busbar conductors, between the topmost busbar conductor and the top section of the housing, and between the bottommost busbar conductor and the bottom section of the housing to form a thermal bridge or heat sink from the stack of conductors to the housing.

3. The busway section of claim 2, further comprising:
a plurality of electrically insulating sheets covering both sides of the elongated straight section of each of the busbar conductors except in corresponding areas where at least a portion of the first, second, and third set of pads overlays respective ones of the busbar conductors.

4. The busway section of claim 3, wherein each of the sheets is a sleeve that surrounds respective ones of the busbar conductors, the sleeve including a cutout at each of the first and second end portions to permit the pad to contact directly the busbar conductor through the cutout.

5. The busway section of claim 4, wherein the cutout has width and length dimensions smaller than corresponding width and length dimensions of the pad.

6. The busway section of claim 2, in combination with a joint pack for joining multiple busway sections together, wherein the first joint end portion or the second end portion is connected to the joint pack and wherein the temperature of the joint pack is reduced compared to a busway system that lacks the second set or the third set of pads.

7. The busway section of claim 1, further comprising:
a plurality of electrically insulating sheets covering both sides of the elongated straight section of each of the busbar conductors except in corresponding areas where at least a portion of the first set of pads directly contacts respective ones of the busbar conductors.

8. The busway section of claim 1, wherein the pads are composed of a material that is thermally conductive and electrically insulating and have a thermal conductivity of at least 2.0 Watts per meter-Kelvin (W/m-K).

9. The busway section of claim 8, wherein each of the pads includes an adhesive backing and is composed of a silicone-free, compressive material.

10. The busway section of claim 1, wherein a dimension of each of the pads along a direction of the elongated straight section of the conductors does not exceed a width dimension of elongated straight section.

11. The busway section of claim 1, wherein each of the pads has a generally square shape.

12. The busway section of claim 1, wherein the number of pads is greater than the number of conductors.

13. The busway section of claim 12,
wherein the number of busbar conductors is three, each of the busbar conductors carrying a different phase of electricity from one another, and
wherein a first of the pads is sandwiched between the topmost busbar conductor and the top section of the housing, a second of the pads is sandwiched between the topmost busbar conductor and a second one of the three busbar conductors, a third of the pads is sandwiched between the second busbar conductor and the bottommost busbar conductor, and a fourth of the pads is sandwiched between the bottommost busbar conductor and the bottom section of the housing.

14. The busway section of claim 12,
wherein the number of busbar conductors is four such that three of the busbar conductors carry a different phase of electricity from one another and one of the busbar conductors carries neutral current back to a source of the electricity or ground current to earth, and
wherein a first of the pads is sandwiched between the topmost busbar conductor and the top section of the housing, a second of the pads is sandwiched between the topmost busbar conductor and a second of the four busbar conductors, a third of the pads is sandwiched between the second and a third the four busbar conductors, a fourth of the pads is sandwiched between the third busbar conductor and the bottommost busbar conductor, and a fifth of the pads is sandwiched between the bottommost busbar conductor and the bottom section of the housing.

15. The busway section of claim 1, wherein the busbar conductors are rated to carry at least 225 amps of electrical current and are composed of an electrically conductive material that includes copper.

16. The busway section of claim 2, wherein the middle portion is the center.

17. The busway section of claim 1, wherein the housing includes two opposing side sections between the top and the bottom sections and extending along the elongated straight sections of the busbar conductors, the top section, the bottom section, and the two opposing side sections of the housing substantially enclosing the stack of the busbar conductors.

18. A busway, comprising:
at least three electrically conductive busbar conductors stacked on top of one another to form a stack, each of the busbar conductors having an elongated straight section;
a first set of thermally conductive, insulating material (TCIM) pads positioned in a middle portion of the stack of conductors such that respective ones of the first set of pads are positioned between each directly opposing pair of the busbar conductors;
a second set of TCIM pads positioned at a first joint end portion of the stack of conductors such that respective ones of the second set of pads are positioned between each directly opposing pair of the busbar conductors
a third set of TCIM pads positioned at a second joint end portion of the stack of conductors opposite the first end portion such that respective ones of the third set of pads are positioned between each directly opposing pair of the busbar conductors;
a plurality of electrically insulating sheets covering both major flat surfaces of the elongated straight section of each of the busbar conductors except in corresponding areas where at least a portion of the first, second, and third set of pads directly contacts respective ones of the busbar conductors.

19. A busway, comprising:
a plurality of electrically conductive busbar conductors stacked on top of one another to form a stack, each of the busbar conductors having an elongated straight section;
a housing having a top section over a topmost one of the busbar conductors and a bottom section under a bottommost one of the busbar conductors;
a first set of thermally conductive, insulating material (TCIM) pads positioned in a middle portion of the stack of conductors such that respective ones of the first set of pads are positioned between each directly opposing pair of the busbar conductors, between a topmost busbar conductor and the top section of the housing, and between a bottommost busbar conductor and the bottom section of the housing; and a plurality of electrically insulating sleeves that surrounds respective ones of the busbar conductors of the elongated straight section of each of the busbar conductors except in corresponding areas where at least a portion of the first, second, and third set of pads directly contacts respective ones of the busbar conductors, wherein each of the sleeves includes a cutout at each of the first and second end portions to permit the corresponding pad to contact directly the corresponding busbar conductor through the corresponding cutout, and wherein each of the cutouts has width and length dimensions smaller than corresponding width and length dimensions of the pad.

* * * * *